(12) United States Patent
Muhammad

(10) Patent No.: US 12,373,683 B2
(45) Date of Patent: Jul. 29, 2025

(54) ANOMALY DETECTION ACCORDING TO A MULTI-MODEL ANALYSIS

(71) Applicant: VIAVI Solutions Inc., San Jose, CA (US)

(72) Inventor: Faris Muhammad, Edgware (GB)

(73) Assignee: VIAVI Solutions Inc., Chandler, AZ (US)

( * ) Notice: Subject to any disclaimer, the term of this patent is extended or adjusted under 35 U.S.C. 154(b) by 883 days.

(21) Appl. No.: 16/881,770

(22) Filed: May 22, 2020

(65) Prior Publication Data

US 2021/0365774 A1 Nov. 25, 2021

(51) Int. Cl.
  *G06N 3/08* (2023.01)
  *G06N 3/045* (2023.01)

(52) U.S. Cl.
  CPC ............... *G06N 3/08* (2013.01); *G06N 3/045* (2023.01)

(58) Field of Classification Search
  CPC .......... G06N 3/08; G06N 3/045; G06N 3/044; G06N 20/20
  See application file for complete search history.

(56) References Cited

U.S. PATENT DOCUMENTS 11,038,775 B2 * 6/2021 Pandey .................... H04L 41/16
12,056,579 B1 * 8/2024 Mattar .................... G06N 20/00
2015/0100524 A1 * 4/2015 Pantel .................... G06N 20/00
 706/12
2018/0219889 A1 8/2018 Oliner et al.
2021/0281592 A1 * 9/2021 Givental ............... G06N 20/10

FOREIGN PATENT DOCUMENTS

WO  WO-2021118526 A1 * 6/2021 ............ G06F 11/004

OTHER PUBLICATIONS

Gadal, S. M. A. M., & Mokhtar, R. A. (Jan. 2017). Anomaly detection approach using hybrid algorithm of data mining technique. In 2017 International Conference on Communication, Control, Computing and Electronics Engineering (ICCCCEE) (pp. 1-6). IEEE. (Year: 2017).*

(Continued)

*Primary Examiner* — Ryan C Vaughn
(74) *Attorney, Agent, or Firm* — Harrity & Harrity, LLP

(57) ABSTRACT

An anomaly detection system may train a first model associated with detecting anomalies involving a log source based on first historical logs associated with the log source and may train a second model associated with the log source based on second historical logs associated with the log source and target data that are associated with the second historical logs. The anomaly detection system may cause the first model to process the second historical logs to generate training anomaly data of the log source. The anomaly detection system may train a third model associated with the log source based on the training anomaly data and the target data. The anomaly detection system may configure, based on outputs from the second model and the third model, an anomaly detection model to detect the anomalies in input data that are provided to the first model and the second model.

20 Claims, 11 Drawing Sheets

(56) References Cited

OTHER PUBLICATIONS

Hill, D. J., & Minsker, B. S. (2010). Anomaly detection in streaming environmental sensor data: A data-driven modeling approach. Environmental Modelling & Software, 25(9), 1014-1022. (Year: 2010).*
Extended European Search Report for Application No. EP21174339. 8, mailed on Mar. 30, 2022, 11 pages.
Kruegel et al., "A Multi-model Approach to the Detection of Web-based Attacks," Computer Networks, Elsevier, Aug. 5, 2005, vol. 48 (5), pp. 717-738.
Xia et al., "Ensemble Methods for Anomaly Detection Based on System Log," IEEE 2019 24th Pacific Rim International Symposium on Dependable Computing (PRDC), Dec. 1, 2019, pp. 930-931.
M. Du, F. Li, G. Zheng and V. Srikumar, "DeepLog: Anomaly Detection and Diagnosis from System Logs through Deep Learning," the 2017 ACM SIGSAC Conference, 2017.
Q. Fu, J.-G. Lou, Y. Wang and J. Li, "Execution Anomaly Detection in Distributed Systems through Unstructured Log Analysis," International Conference on Data Mining (ICDM), No. IEEE, pp. 149-158, 2009.
S. He, . J. Zhu, P. He and M. R. Lyu, "Experience Report: System Log Analysis for Anomaly Detection," No. IEEE, 2016.
P. Kostjens, "Anomaly Detection in Application Log Data," 2018.
J.-G. Lou, Q. Fu, S. Yang, Y. Xu and J. Li, "Mining Invariants from Console Logs for System Problem Detection," 2010.
S. Lu, X. Wei, Y. Li and L. Wang, "Detecting Anomaly in Big Data System Logs Using Convolutional Neural Network," 2018 IEEE 16th Intl Conf on Dependable, Autonomic and Secure Computing, 16th Intl Conf on Pervasive Intelligence and Computing, 4th Intl Conf on Big Data Intelligence and Computing and Cyber Science and Technology Congress (DASC/PiCom/DataCom/CyberSciTech), 2018.
J. Shi, G. He and X. Liu, "Anomaly Detection for Key Performance Indicators Through Machine Learning," 2018 International Conference on Network Infrastructure and Digital Content (IC-NIDC), 2018.
M. Wang, L. Xu and L. Guo, "Anomaly Detection of System Logs Based on Natural Language Processing and Deep Learning," 2018 4th International Conference on Frontiers of Signal Processing (ICFSP), No. IEEE, 2018.
W. Xu, L. Huang, A. Fox, D. Patterson and M. Jordan, "Online system problem detection by mining patterns of console logs," 2009 Ninth IEEE International Conference on Data Mining, No. IEEE, 2009.
K. Zhang, J. Xu, M. R. Min, G. Jiang, K. Pelechrinis and H. Zhang, "Automated IT system failure prediction: A deep learning approach," 2016 IEEE International Conference on Big Data (Big Data), No. IEEE, 2016.
J. Ngiam, A. Khosla, M. Kim, J. Nam, H. Lee and A. Y. Ng, "Multimodal Deep Learning", 2011.
"Anomaly Detection from System Tracing Data using Multimodel Deep Learning," 12th International Conference on Cloud Computing (CLOUD), No. IEEE, pp. 179-186, 2019.

* cited by examiner

ANOMALY DETECTION ACCORDING TO A MULTI-MODEL ANALYSIS

BACKGROUND

Machine learning is a field of computer science that aims to provide computer systems with the ability to "learn" (i.e., progressively improve performance on a specific task) with data, without being explicitly programmed. Approaches for machine learning include decision tree learning, artificial neural networks (e.g., deep learning networks, support vector machines, genetic algorithms), and others.

SUMMARY

According to some implementations, a method may include training, by a device, a first model associated with detecting anomalies involving a log source, wherein the first model is trained based on first historical logs associated with the log source; training, by the device, a second model associated with the log source, wherein the second model is trained based on second historical logs associated with the log source and target data that are associated with the second historical logs; causing, by the device, the first model to process the second historical logs to generate training anomaly data of the log source; training, by the device, a third model associated with the log source, wherein the third model is trained based on the training anomaly data and the target data; and configuring, by the device and based on outputs from the second model and the third model, an anomaly detection model to detect anomalies in input data that are provided to the first model and the second model.

According to some implementations, an anomaly detection system may include one or more memories and one or more processors. In some implementations, the one or more processors are communicatively coupled to the one or more memories. The one or more processors may be configured to: train a first model associated with a first log source, wherein the first model is trained based on first historical logs associated with the first log source; train a second model associated with the first log source, wherein the second model is trained based on second historical logs associated with the first log source and first target data that are associated with the second historical logs; cause the first model to process the second historical logs to generate first training anomaly data of the first log source; train a third model associated with the first log source, wherein the third model is trained based on the first training anomaly data and the first target data; train a fourth model associated with a second log source, wherein the fourth model is trained based on third historical logs associated with the second log source; train a fifth model associated with the second log source, wherein the fifth model is trained based on fourth historical logs associated with the second log source and second target data that are associated with the fourth historical logs; cause the fourth model to process the fourth historical logs to generate second training anomaly data of the second log source; train a sixth model associated with the second log source, wherein the sixth model is trained based on the second training anomaly data and the second target data; and configure an anomaly detection model to detect anomalies in input data that are provided to the first model and the second model, wherein the anomaly detection model is configured to detect the anomalies in the input data based on outputs from the second model, the third model, the fifth model, and the sixth model.

According to some implementations, a non-transitory computer-readable medium may store one or more instructions. The one or more instructions, when executed by one or more processors of an anomaly detection system, may cause the one or more processors to: receive log data associated with a log source; process, via a first model, the log data to determine first anomaly data in the log data, wherein the first model was trained based on first historical logs associated with the log source; process, via a second model, the log data to determine a first probability that the log data include an anomaly, wherein the second model was trained based on second historical logs associated with the log source and target data that are associated with the second historical logs; process, via a third model, the first anomaly data to determine a second probability that the log data include an anomaly, wherein the third model was trained based on the target data and training anomaly data associated with the first model; and perform an action based on the first probability and the second probability.

DETAILED DESCRIPTION

The following detailed description of example implementations refers to the accompanying drawings. The same reference numbers in different drawings may identify the same or similar elements.

A deep neural network comprising a plurality of machine learning models may be applied to system logs of a system to identify one or more anomalies in the system logs. Often, however, the plurality of machine learning models are trained using the same or similar (e.g., homogenous) training data. This can lead to the deep neural network not being able to identify anomalies in the system logs that were not represented in the training data. An unidentified anomaly may result in one or more errors in the system not being addressed, which may impact a performance and/or waste computing resources (e.g., processing resources, memory resources, power resources, communication resources, and/or the like) of one or more devices of the system.

Some implementations described herein provide an anomaly detection system that trains multiple sets of models using different types of historical log data to create a model matrix that is more likely to identify anomalies associated with non-homogenous input logs than would be identified using an existing deep neural network technique. Accordingly, the anomaly detection system may allow one or more errors in the system associated with the anomaly to be addressed and/or corrected, which may improve and/or maintain a performance of one or more devices of the system and may prevent waste of computing resources (e.g., processing resources, memory resources, power resources, communication resources, and/or the like) of the one or more devices. Moreover, the model matrix may be scalable horizontally (e.g., the model matrix may include any number of model layers) and/or vertically (e.g., each layer of the model matrix may include any number of models) to provide a desired level of granularity and/or accuracy for detecting anomalies.

Figure 1A:
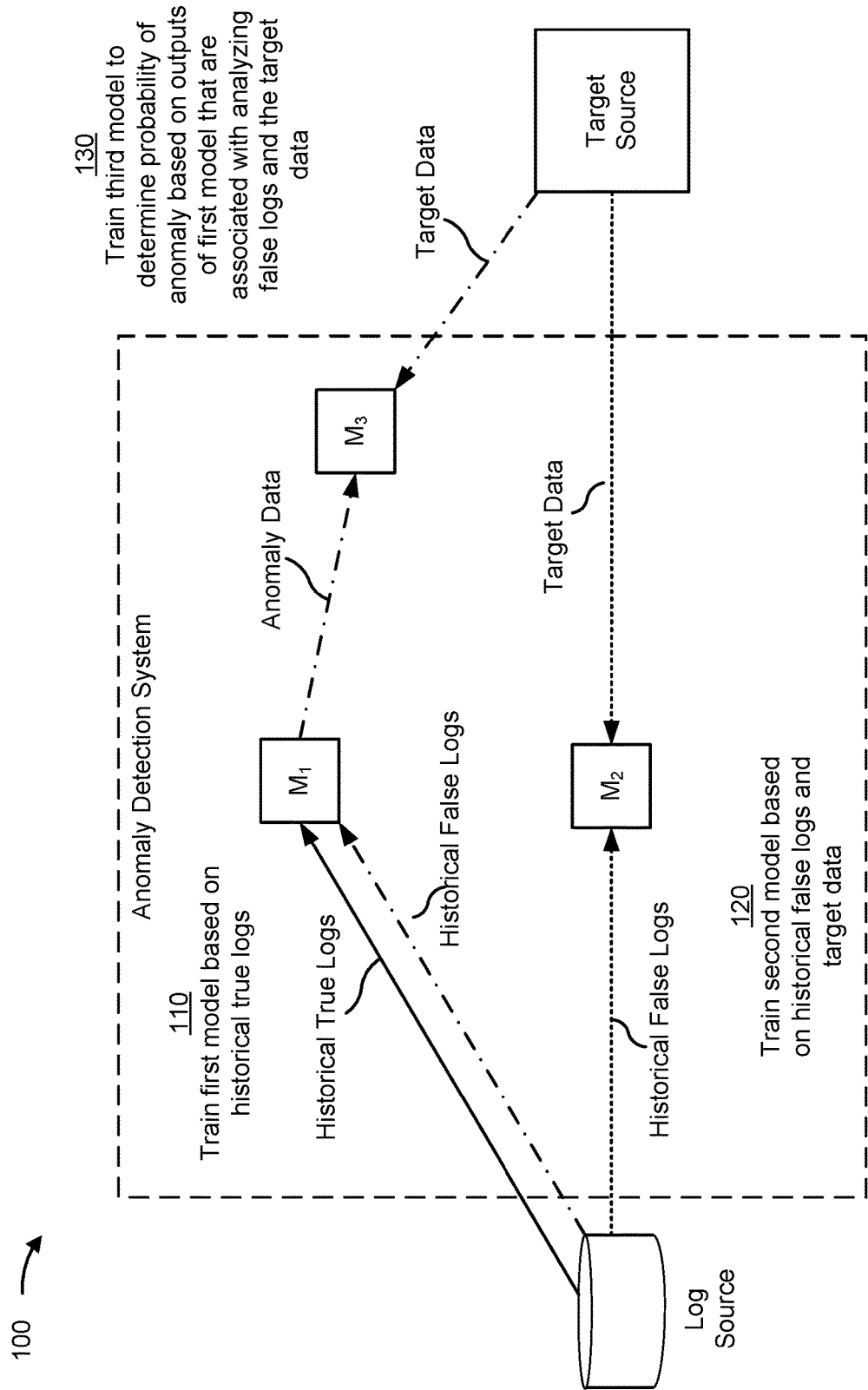
FIGS. 1A-1B are diagrams of an example implementation described herein.
Figure 1B:
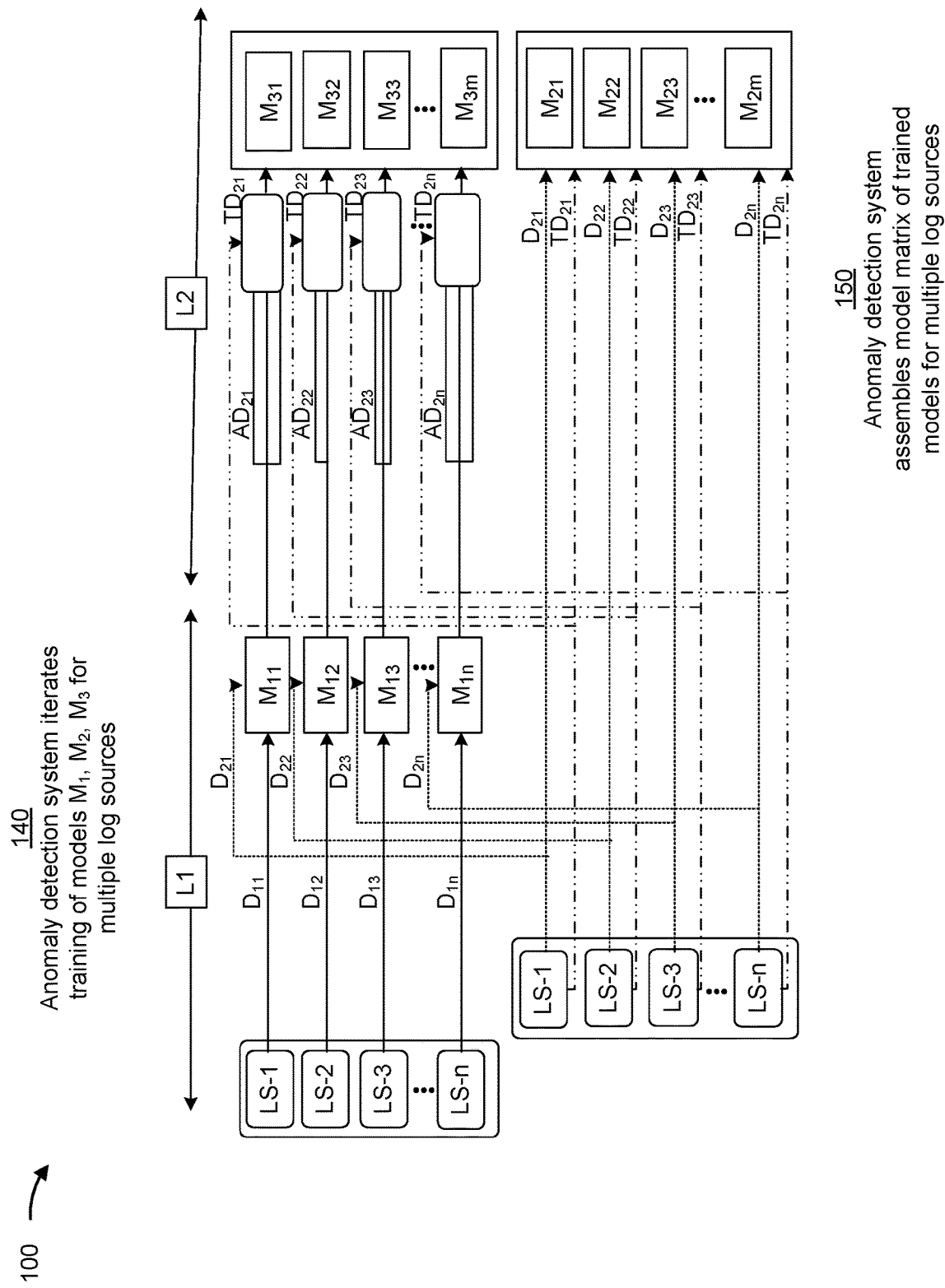

FIGS. 1A-1B are diagrams of one or more example implementations 100 described herein. As shown in FIGS. 1A-1B, example implementation(s) 100 include an anomaly detection system, a log source, and/or a target source. The log source may include a data structure that is configured to maintain logs associated with events involving a particular device, a particular application, a particular network, and/or the like. The target source may be included in the log source or may be separate from the log source. The target source may include a data structure that is configured to maintain target data that are associated with detected anomalies of the logs maintained by the data structure of the log source.

As shown by reference number 110, the anomaly detection system may train a first model (shown in FIG. 1A as model $M_1$). For example, the anomaly detection system may train a first model to be used to process log data associated with one or more logs to identify one or more anomalies associated with the one or more logs. In some implementations, the first model may be a neural network (e.g., a recurrent neural network, a long short term memory (LSTM) model, and/or the like). For example, the first model may be an individually trained recurrent neural network.

As shown in FIG. 1A and indicated by an arrow with a solid line from the log source to the first model, the anomaly detection system may obtain one or more historical true logs from the log source and may train the first model based on the one or more historical true logs. The one or more historical true logs may be logs that do not include anomalies. For example, the one or more historical true logs may be collected from unsupervised field logs that do not include anomalies. The anomaly detection system may train and/or use the first model in a similar manner to that described below with respect to FIGS. 5 and 6.

As shown by reference number 120, the anomaly detection system may train a second model (shown in FIG. 1A as model $M_2$). For example, the anomaly detection system may train a second model to be used to process log data associated with one or more logs to determine a probability of anomalies associated with the one or more logs. In some implementations, the second model may be a neural network (e.g., a recurrent neural network, an LSTM model, and/or the like). For example, the second model may be an individually trained recurrent neural network.

As shown in FIG. 1A and indicated by an arrow with a dotted line from the log source to the second model, the anomaly detection system may obtain one or more historical false logs from the log source and may train the second model based on the one or more historical false logs. The one or more historical false logs may be logs that include anomalies. For example, the one or more historical false logs may be collected from supervised field logs that include one or more previously detected anomalies. Additionally, or alternatively, as shown in FIG. 1A and indicated by an arrow with a dotted line from the target source to the second model, the anomaly detection system may obtain target data from the target source and may train the second model based on the one or more historical false logs and the target data. The target data may be associated with the one or more previously detected anomalies within the one or more historical false logs (e.g., the target data may identify the one or more previously detected anomalies). The anomaly detection system may train and/or use the second model in a similar manner to that described below with respect to FIGS. 5 and 6.

As shown by reference number 130, the anomaly detection system may train a third model (shown in FIG. 1A as model $M_3$). For example, the anomaly detection system may train a third model to be used to process anomaly data associated with one or more log files to determine a probability of anomalies associated with the one or more log files. In some implementations, the third model is a different type of model from the first model or the second model. For example, the third model may be an association matrix when at least one of the first model or the second model is a neural network.

As shown in FIG. 1A and indicated by an arrow with a dashed-dotted line from the first model to the third model, the anomaly detection system may obtain anomaly data from the first model and may train the third model based on the anomaly data. In some implementations, as shown in FIG. 1A and indicated by an arrow with a dashed-dotted line from the log source to the first model, the anomaly detection system may obtain the one or more historical false logs from the log source and may cause the first model to be used to process the one or more historical false logs to generate the anomaly data. That is, in some implementations, the first model, after being trained based on the one or more historical true logs, may be used to process the one or more historical false logs to generate the anomaly data, and the anomaly detection system may train the third model based on the anomaly data. Additionally, or alternatively, as shown in FIG. 1A and indicated by an arrow with a dashed-dotted line from the target source to the third model, the anomaly detection system may obtain the target data from the target source and may train the third model based on the anomaly data and the target data. The anomaly detection system may train and/or use the third model in a similar manner to that described below with respect to FIGS. 5 and 6.

As shown in FIG. 1B and by reference number 140, the anomaly detection system may iterate training of multiple first models, multiple second models, and multiple third models for multiple log sources in a similar manner as described herein in relation to FIG. 1A. For example, the anomaly detection system may train a plurality of first models (shown in FIG. 1B as models $M_{11}$ through $M_{1n}$, where n is greater than 1) using a plurality of sets of historical true logs (shown in FIG. 1B as sets of historical true logs $D_{11}$ through $D_{1n}$) from a plurality of log sources (shown in FIG. 1B as log sources LS-1 through LS-n) (e.g., the first model $M_{11}$ may be trained using a set of historical true logs $D_{11}$ from the log source LS-1, the first model $M_{12}$ may be trained using a set of historical true logs $D_{12}$ from the log source LS-2, and so on).

As another example, the anomaly detection system may train a plurality of second models (shown in FIG. 1B as models $M_{21}$ through $M_{2m}$, where m is greater than 1) using a plurality of sets of historical false logs (shown in FIG. 1B as sets of historical false logs $D_{21}$ through $D_{2n}$) and a plurality of sets of target data (shown in FIG. 1B as sets of target data $TD_{21}$ through $TD_{2n}$) from a plurality of log sources (shown in FIG. 1B as log sources LS-1 through LS-n) (e.g., the second model $M_{21}$ may be trained using a set of historical false logs $D_{21}$ and a set of target data $TD_{21}$ from the log source LS-1, the second model $M_{22}$ may be trained using a set of historical false logs $D_{22}$ and a set of target data $TD_{22}$ from the log source LS-2, and so on). In some implementations, the anomaly detection system may train m second models, where m is based on the number of n log sources (e.g., m may be a number of possible combinations that can be made of the n log sources).

In an additional example, the anomaly detection system may train a plurality of third models (shown in FIG. 1B as models $M_{31}$ through $M_{3m}$, where m is greater than 1) using a plurality of sets of anomaly data (shown in FIG. 1B as sets of anomaly data $AD_{21}$ through $AD_{2n}$) determined by the plurality of first models and the plurality of sets of target data from the plurality of log sources (e.g., the third model $M_{31}$ may be trained using a set of anomaly data $AD_{21}$ and a set of target data $TD_{21}$, the third model $M_{32}$ may be trained using a set of anomaly data $AD_{22}$ and a set of target data $TD_{22}$, and so on). The plurality of first models may be used to process the plurality of sets of historical false logs to determine the plurality of sets of anomaly data (e.g., the first model $M_{11}$ may be used to process the set of historical false logs $D_{21}$ to determine the set of anomaly data $AD_{21}$, the first model $M_{12}$ may be used to process the set of historical false logs $D_{22}$ to determine the set of anomaly data $AD_{22}$, and so on). In some implementations, the anomaly detection system may train m third models, where m is based on the number of n log sources (e.g., m may be a number of possible combinations that can be made of n log sources).

In this way, as shown by reference number 150, the anomaly detection system assembles a model matrix of trained models for multiple log sources. In some implementations, the plurality of first models (e.g., models $M_{11}$ through $M_{1n}$) may be associated with a first layer (shown in FIG. 1B as layer L1) of the model matrix and the plurality of second models (e.g., models $M_{21}$ through $M_{2m}$) and the plurality of third models (e.g., models $M_{31}$ through $M_{3m}$) may be associated with a second layer of the model matrix (shown in FIG. 1B as layer L2).

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
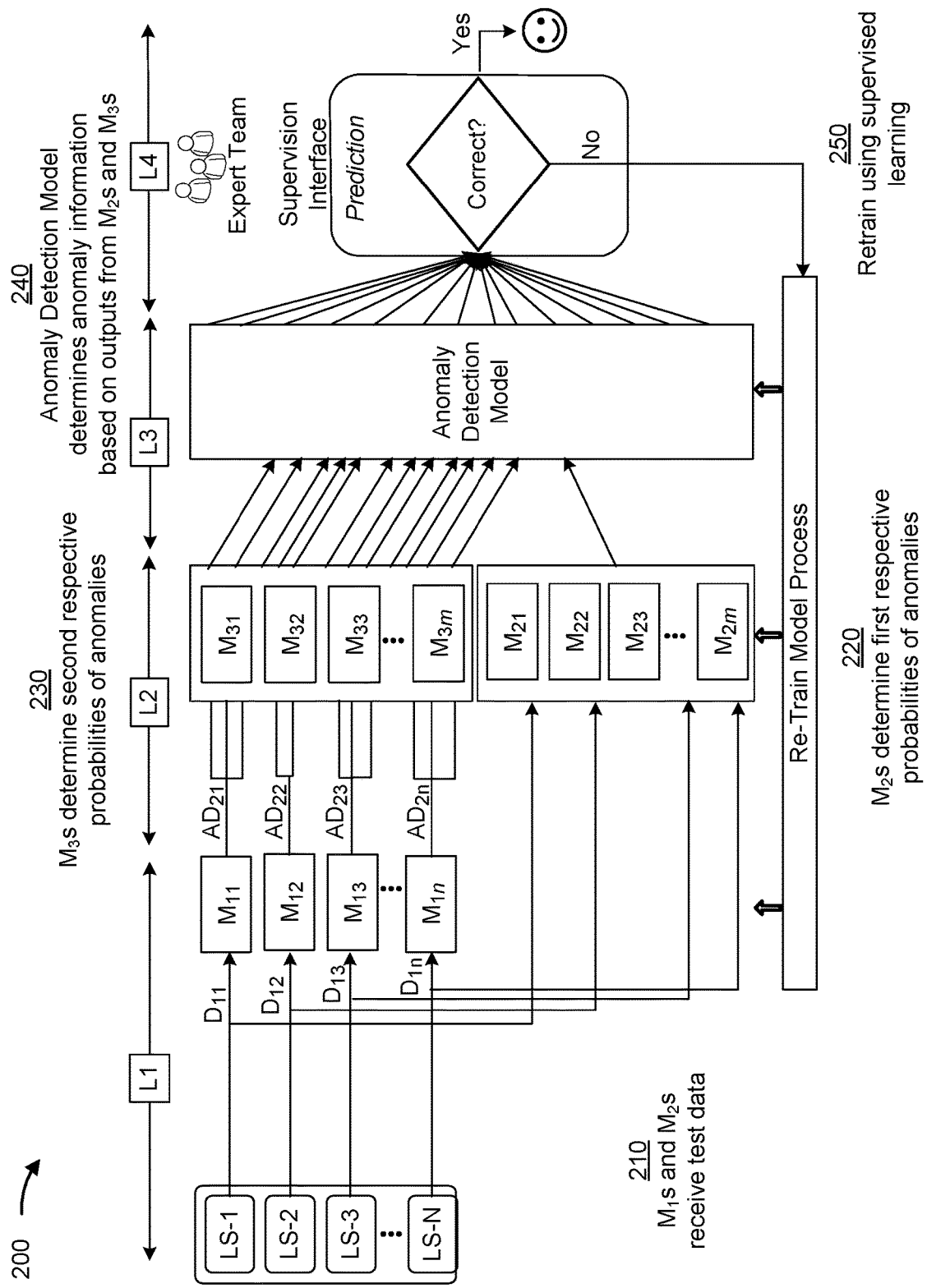
FIG. 2 is a diagram of an example implementation that includes a model matrix described herein.

FIG. 2 is a diagram of an example implementation 200 described herein. As shown in FIG. 2, example implementation 200 includes a model matrix that includes the plurality of first models (shown in FIG. 2 as models $M_1$ through $M_{1n}$, where n is greater than 1), the plurality of second models (shown in FIG. 2 as models $M_{21}$ through $M_{2m}$, where m is greater than 1), and the plurality of third models (shown in FIG. 2 as models $M_{31}$ through $M_{3m}$) that have been trained in a similar manner as described herein in relation to FIGS. 1A-1B. As described in relation to FIG. 1B, the plurality of first models may be associated with a first layer of the model matrix (shown in FIG. 2 as layer L1) and the plurality of second models and the plurality of third models may be associated with a second layer of the model matrix (shown in FIG. 2 as layer L2). As shown in FIG. 2, the model matrix may also include an anomaly detection model associated with a third layer (shown in FIG. 2 as layer L3) of the model matrix and/or a supervision interface (e.g., a user interface) associated with a fourth layer (shown in FIG. 2 as layer L4) of the model matrix.

In some implementations, the anomaly detection system may configure the anomaly detection model (e.g., based on outputs from the plurality of second models and the plurality of third models). Accordingly, the anomaly detection model may detect anomalies in input data that are provided to the plurality of first models and the plurality of second models. In some implementations, the supervision interface may allow a team of experts to review anomalies detected by the anomaly detection model, as further described herein.

As shown by reference number 210 the plurality of first models and the plurality of second models may receive a plurality of sets of test data (shown in FIG. 2 as sets of test data $D_{11}$ through $D_{1n}$) from a plurality of log sources (shown in FIG. 2 as log sources LS-1 through LS-n). The sets of test data may include log data associated with the plurality of log sources. The plurality of first models may be used to process the plurality of sets of test data to determine a plurality of sets of anomaly data (shown in FIG. 2 as sets of anomaly data $AD_{21}$ through $AD_{2n}$). As shown by reference number 220, the plurality of second models may be used to process the plurality of sets of test data to determine first respective probabilities that one or more of the sets of test data and/or combinations of the sets of test data include an anomaly. As shown by reference number 230, the plurality of third models may be used to process the plurality of sets of anomaly data (e.g., that was determined using the plurality of first models based on the plurality of sets of test data) to determine second respective probabilities that one or more of the sets of test data and/or combinations of the sets of test data include an anomaly.

As shown in FIG. 2, the anomaly detection model may receive the first respective probabilities that one or more of the sets of test data and/or combinations of the sets of test data include an anomaly (e.g., determined using the plurality of second models) and may receive the second respective probabilities that one or more of the sets of test data and/or combinations of the sets of test data include an anomaly (e.g., determined using the plurality of third models). As shown by reference number 240, the anomaly detection model may be used to determine, based on the first respective probabilities and the second respective probabilities, anomaly information associated with the sets of test data. The anomaly information may indicate an anomaly; information identifying at least one log source, of the plurality of log sources, associated with the anomaly; information identifying a log associated with the anomaly; information identifying a log entry associated with the anomaly; at least one basis for the anomaly; and/or the like. For example, the anomaly detection model may be used to determine, based on a particular first respective probability satisfying (e.g., being greater than or equal to) a threshold and a corresponding particular second respective probability satisfying the threshold, that a particular log is associated with a particular anomaly.

As shown by reference number 250, the anomaly detection system may retrain and/or reconfigure at least one of the plurality of first models, the plurality of second models, the plurality of third models, the anomaly detection model, and/or the like. For example, the anomaly detection system may provide the anomaly information associated with the sets of test data to the team of experts via the supervision interface. The team of experts may provide feedback on the accuracy of the at least one of the plurality of first models, the plurality of second models, the plurality of third models, the anomaly detection model, and/or the like (e.g., via the supervision interface). The anomaly detection system may retrain and/or reconfigure, based on the feedback, at least one of the plurality of first models, the plurality of second models, the plurality of third models, the anomaly detection model, and/or the like. In this way, the accuracy and/or the performance of the plurality of first models, the plurality of second models, the plurality of third models, the anomaly detection model, and/or the like may improve over time.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged from those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
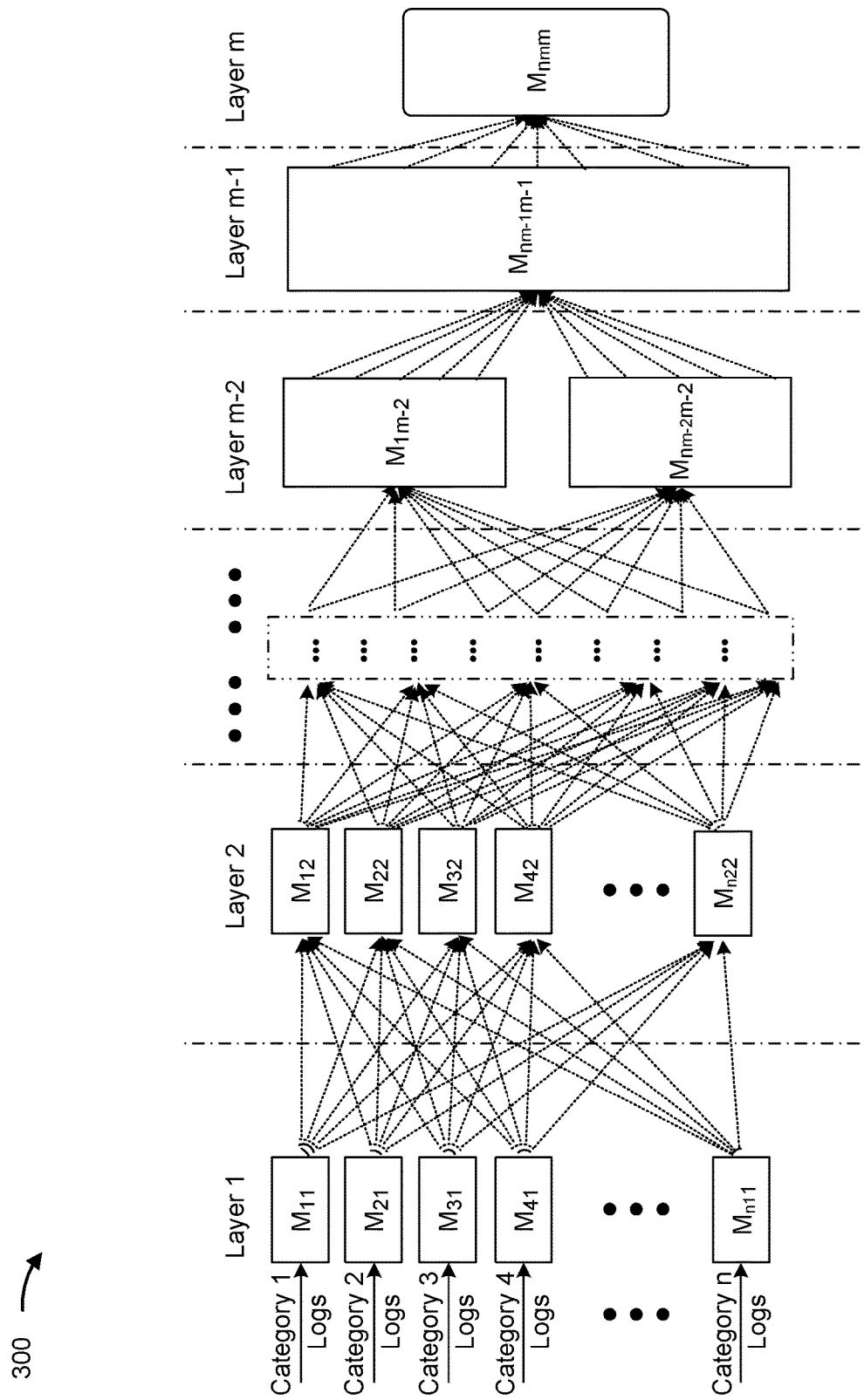
FIG. 3 is a diagram of an example implementation that includes an expanded model matrix described herein.

FIG. 3 is a diagram of an example implementation 300 described herein. As shown in FIG. 3, the model matrix described herein may be expanded to include any number of layers. For example, as shown in FIG. 3, the model matrix may include m layers, where m is greater than 1. Moreover, each layer may be associated with any number of models. For example, layer 1 includes models $M_{11}$ through $M_{n_{1}1}$, layer 2 includes $M_{12}$ through $M_{n_{2}2}$, and so on. In this way, the model matrix may be configured to have as many levels and/or models as are needed, based on a desire level of granularity and/or accuracy for detecting anomalies.

As indicated above, FIG. 3 is provided as an example. Other examples may differ from what is described with regard to FIG. 3.

Figure 4:
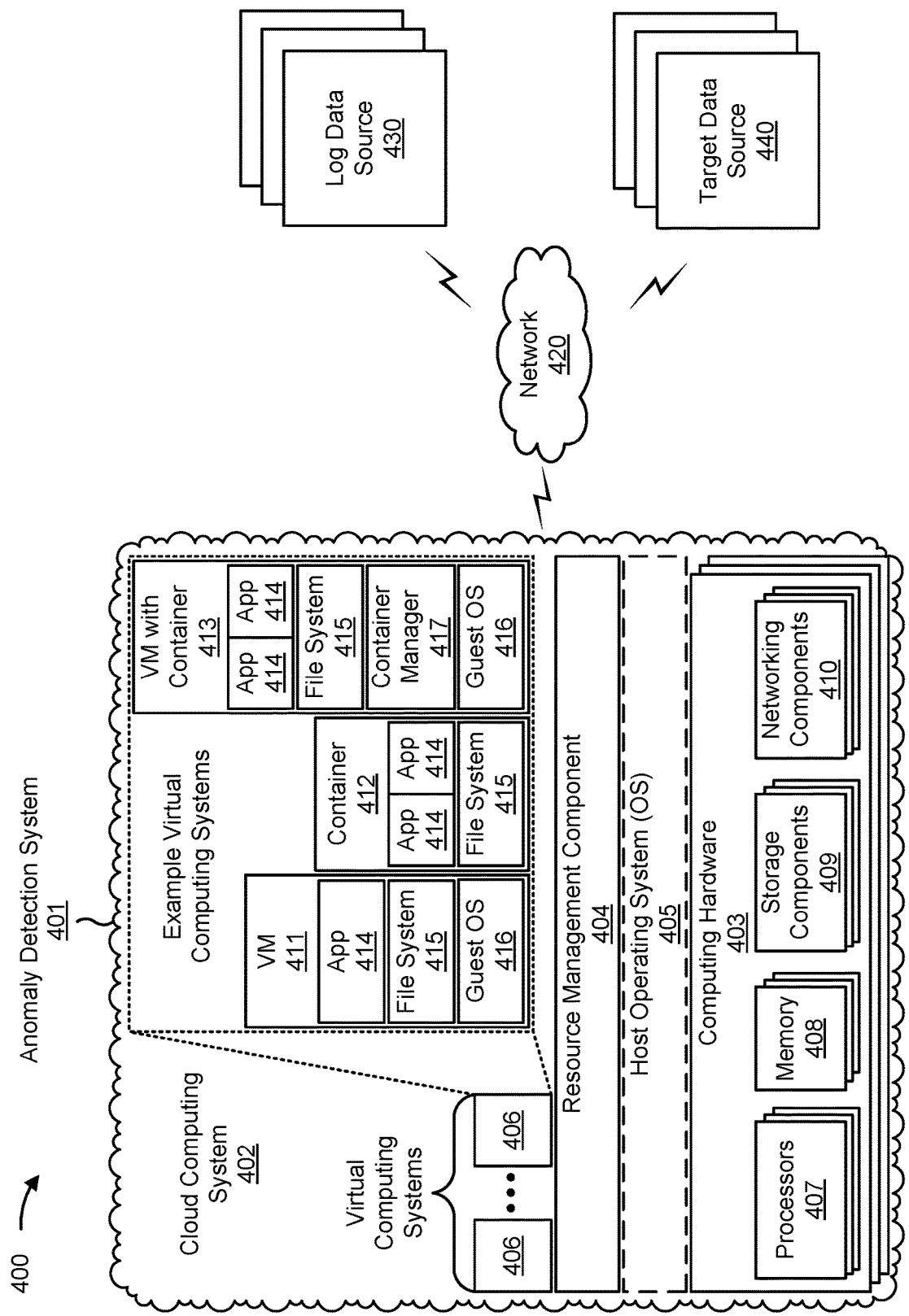
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an anomaly detection system 401. The anomaly detection system 401 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420, a log data source 430, and/or a target data source 440. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the anomaly detection system 401 to perform one or more operations or processes described herein. A storage component 409 includes a hard disk or another type of storage device that stores information, data, and/or software (e.g., code, instructions, and/or the like) related to the operation and use of the anomaly detection system 401. In some implementations, memory 408 and/or storage component 409 is/are implemented as a non-transitory computer readable medium. A networking component 410 includes a network interface and corresponding hardware that enables the anomaly detection system 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the anomaly detection system 401 may include one or more elements 403-417 of the cloud computing system 402, may execute within the cloud computing system 402, and/or may be hosted within the cloud computing system 402, in some implementations, the anomaly detection system 401 may not be cloud-based (e.g., may be implemented outside of a cloud computing system) or may be partially cloud-based. For example, the anomaly detection system 401 may include one or more devices that are not part of the cloud computing system 402, such as device 700 of FIG. 7, which may include a standalone server or another type of computing device. The anomaly detection system 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

The log data source 430 includes one or more devices capable of receiving, generating, storing, processing, providing, and/or routing information associated with log data associated with one or more logs and/or target data associated with detected anomalies associated with the one or more logs. The log data source 430 may include a communication device and/or a computing device. For example, the log data source 430 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The log data source 430 may communicate with one or more other devices of environment 400, as described elsewhere herein.

The target data source 440 includes one or more devices capable of receiving, generating, storing, processing, providing, and/or routing information associated with target data associated with detected anomalies associated with one or more logs. The target data source 440 may include a communication device and/or a computing device. For example, the target data source 440 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The target data source 440 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
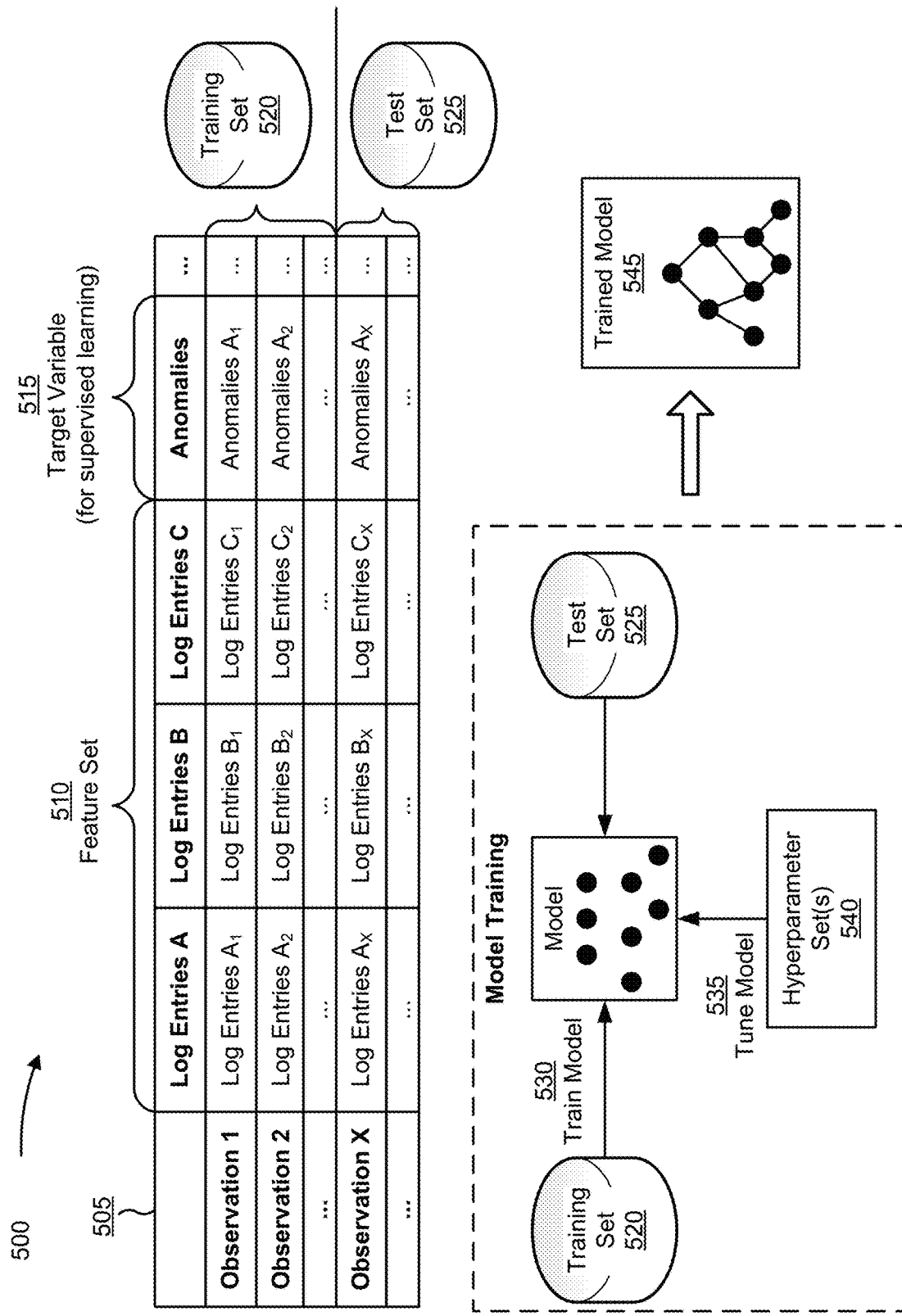
FIGS. 5 and 6 are diagrams of one or more example implementations related to training and applying a machine learning model described herein.

FIG. 5 is a diagram illustrating an example 500 of training a machine learning model. The machine learning model training described herein may be performed using a machine learning system. The machine learning system may include a computing device, a server, a cloud computing environment, and/or the like, such as an anomaly detection system.

As shown by reference number 505, a machine learning model may be trained using a set of observations. The set of observations may be obtained and/or input from historical data, such as data gathered during one or more processes described herein. For example, the set of observations may include data gathered from field logs that include or do not include anomalies, as described elsewhere herein. In some implementations, the machine learning system may receive the set of observations (e.g., as input) from a log data source, a target data source, and/or the like.

As shown by reference number 510, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the log data source, the target data source, and/or the like. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variable types) for a feature set based on input received from the log data source, the target data source, and/or the like, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of log entries A, a second feature of log entries B, a third feature of log entries C, and so on. As shown, for a first observation, the first feature may have a value of log entries $A_1$, the second feature may have a value of log entries $B_1$, the third feature may have a value of log entries $C_1$, and so on. These features and feature values are provided as examples, and may differ in other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 515, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiple classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 520 that includes a first subset of observations, of the set of observations, and a test set 525 that includes a second subset of observations of the set of observations. The training set 520 may be used to train (e.g., fit, tune, and/or the like) the machine learning model, while the test set 525 may be used to evaluate a machine learning model that is trained using the training set 520. For example, for supervised learning, the test set 525 may be used for initial model training using the first subset of observations, and the test set 525 may be used to test whether the trained model accurately predicts target variables in the second subset of observations. In some implementations, the machine learning system may partition the set of observations into the training set 520 and the test set 525 by including a first portion or a first percentage of the set of observations in the training set 520 (e.g., 75%, 80%, or 85%, among other examples) and including a second portion or a second percentage of the set of observations in the test set 525 (e.g., 25%, 20%, or 15%, among other examples). In some implementations, the machine learning system may randomly select observations to be included in the training set 520 and/or the test set 525.

As shown by reference number 530, the machine learning system may train a machine learning model using the training set 520. This training may include executing, by the machine learning system, a machine learning algorithm to determine a set of model parameters based on the training set 520. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 520). For example, for a regression algorithm, a model parameter may include a regression coefficient (e.g., a weight). For a decision tree algorithm, a model parameter may include a decision tree split location, as an example.

As shown by reference number 535, the machine learning system may use one or more hyperparameter sets 540 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 520. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 520. The machine learning system may tune each machine learning algorithm using one or more hyperparameter sets 540 (e.g., based on operator input that identifies hyperparameter sets 540 to be used, based on randomly generating hyperparameter values, and/or the like). The machine learning system may train a particular machine learning model using a specific machine learning algorithm and a corresponding hyperparameter set 540. In some implementations, the machine learning system may train multiple machine learning models to generate a set of model parameters for each machine learning model, where each machine learning model corresponds to a different combination of a machine learning algorithm and a hyperparameter set 540 for that machine learning algorithm.

In some implementations, the machine learning system may perform cross-validation when training a machine learning model. Cross validation can be used to obtain a reliable estimate of machine learning model performance using only the training set 520, and without using the test set 525, such as by splitting the training set 520 into a number of groups (e.g., based on operator input that identifies the number of groups, based on randomly selecting a number of groups, and/or the like) and using those groups to estimate model performance. For example, using k-fold cross-validation, observations in the training set 520 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 540 associated with a particular machine learning algorithm. The machine learning system may compare the overall cross-validation scores for different hyperparameter sets 540 associated with the particular machine learning algorithm, and may select the hyperparameter set 540 with the best (e.g., highest accuracy, lowest error, closest to a desired threshold, and/or the like) overall cross-validation score for training the machine learning model. The machine learning system may then train the machine learning model using the selected hyperparameter set 540, without cross-validation (e.g., using all of data in the training set 520 without any hold-out groups), to generate a single machine learning model for a particular machine learning algorithm. The machine learning system may then test this machine learning model using the test set 525 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 545 to be used to analyze new observations, as described below in connection with FIG. 6.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 520 (e.g., without cross-validation), and may test each machine learning model using the test set 525 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 545.

As indicated above, FIG. 5 is provided as an example. Other examples may differ from what is described in connection with FIG. 5. For example, the machine learning model may be trained using a different process than what is described in connection with FIG. 5. Additionally, or alternatively, the machine learning model may employ a different machine learning algorithm than what is described in connection with FIG. 5, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 6:
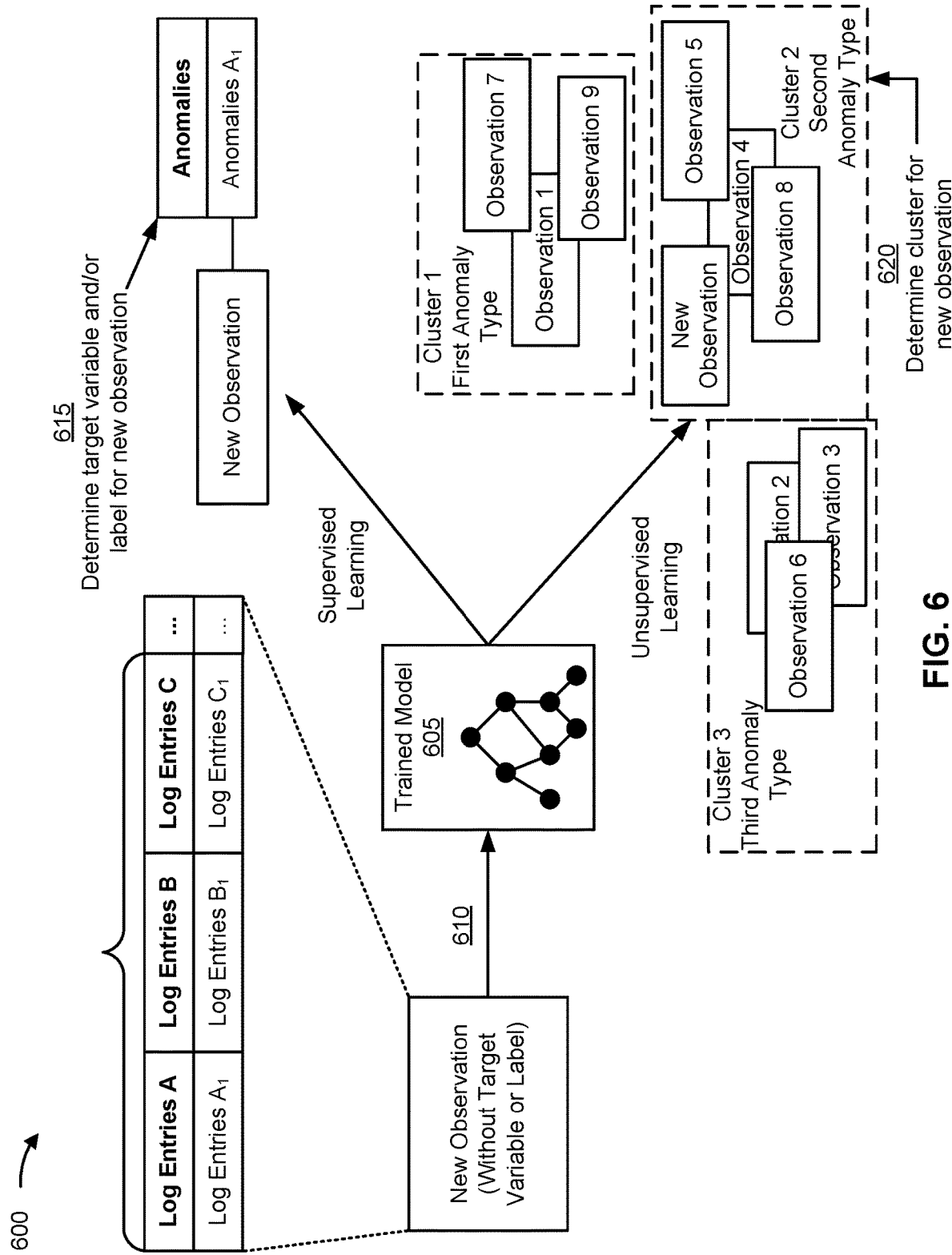

FIG. 6 is a diagram illustrating an example 600 of applying a trained machine learning model to a new observation. The new observation may be input to a machine learning system that stores a trained machine learning model 605. In some implementations, the trained machine learning model 605 may be the trained machine learning model 545 described above in connection with FIG. 5. The machine learning system may include a computing device, a server, a cloud computing environment, and/or the like, such as an anomaly detection system.

As shown by reference number 610, the machine learning system may receive a new observation (or a set of new observations), and may input the new observation to the machine learning model 605. As shown, the new observation may include a first feature of log entries A, a second feature of log entries B, a third feature of log entries C, and so on, as an example. The machine learning system may apply the trained machine learning model 605 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 605 may predict a value of anomalies $A_1$ for the target variable of anomalies, for example, for the new observation, as shown by reference number 615. In some implementations, the trained machine learning model 605 may classify (e.g., cluster) the new observation in a first anomaly type cluster, a second anomaly type cluster, a third anomaly type cluster, and/or the like as shown by reference number 620. The observations within a cluster may have a threshold degree of similarity. In this way, the machine learning system may apply a rigorous and automated process of determining and/or identifying an anomaly associated with one or more logs. The machine learning system may apply a similarly rigorous and automated process for determining probabilities of anomalies associated with one or more logs and/or one or more combinations of logs as described herein.

As indicated above, FIG. 6 is provided as an example. Other examples may differ from what is described in connection with FIG. 6.

Figure 7:
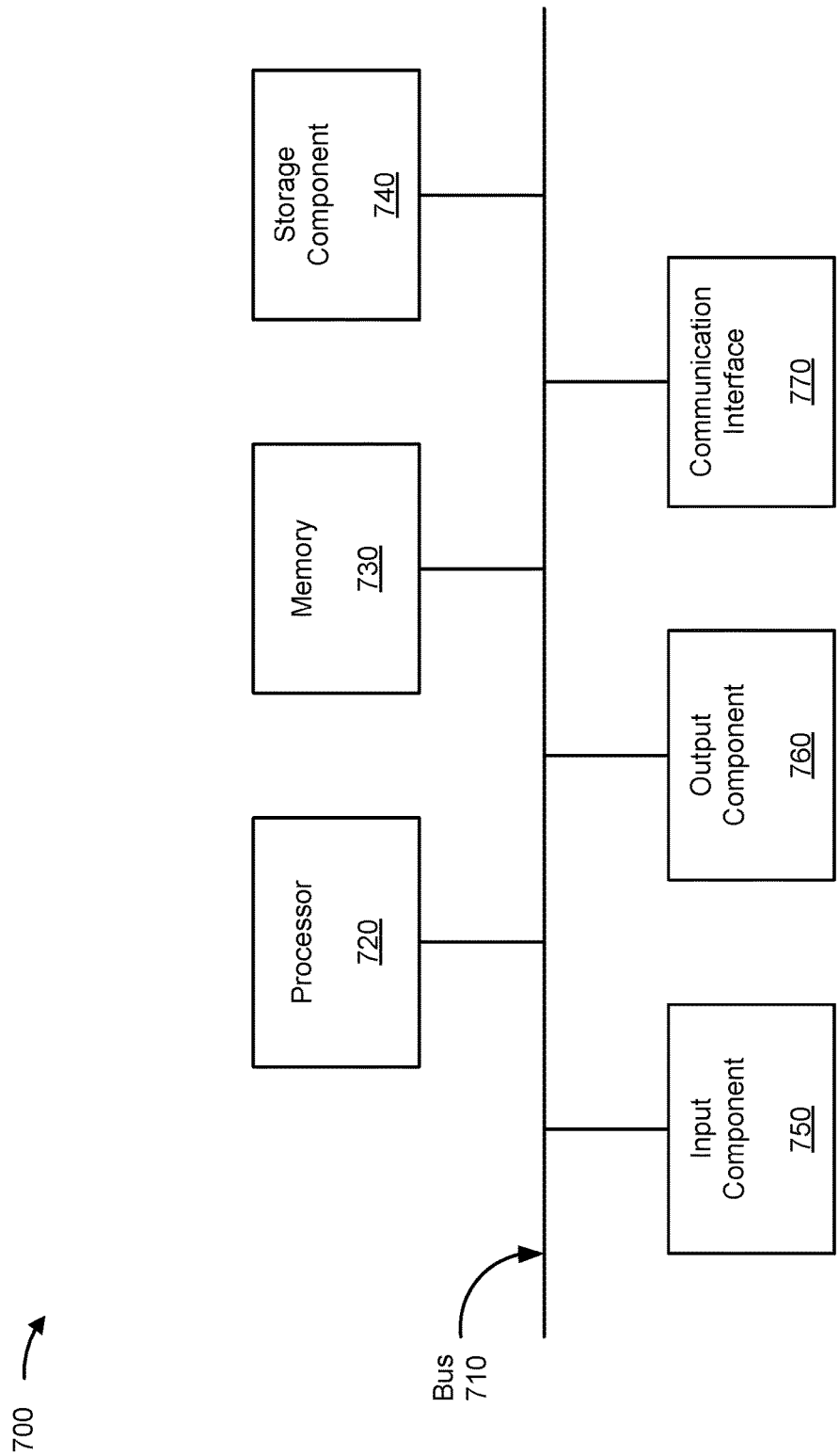
FIG. 7 is a diagram of example components of one or more devices of FIG. 4.

FIG. 7 is a diagram of example components of a device 700. Device 700 may correspond to anomaly detection system 401, processors 407, log data source 430, and/or target data source 440. In some implementations, anomaly detection system 401, processors 407, log data source 430, and/or target data source 440 may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more LEDs).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, an RF interface, a universal serial bus (USB) interface, a wireless local area interface, a cellular network interface, and/or the like.

Device 700 may perform one or more processes described herein. Device 700 may perform these processes based on processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components from those shown in FIG. 7. Additionally, or alternatively, a set of components (e.g., one or more components) of device 700 may perform one or more functions described as being performed by another set of components of device 700.

Figure 8:
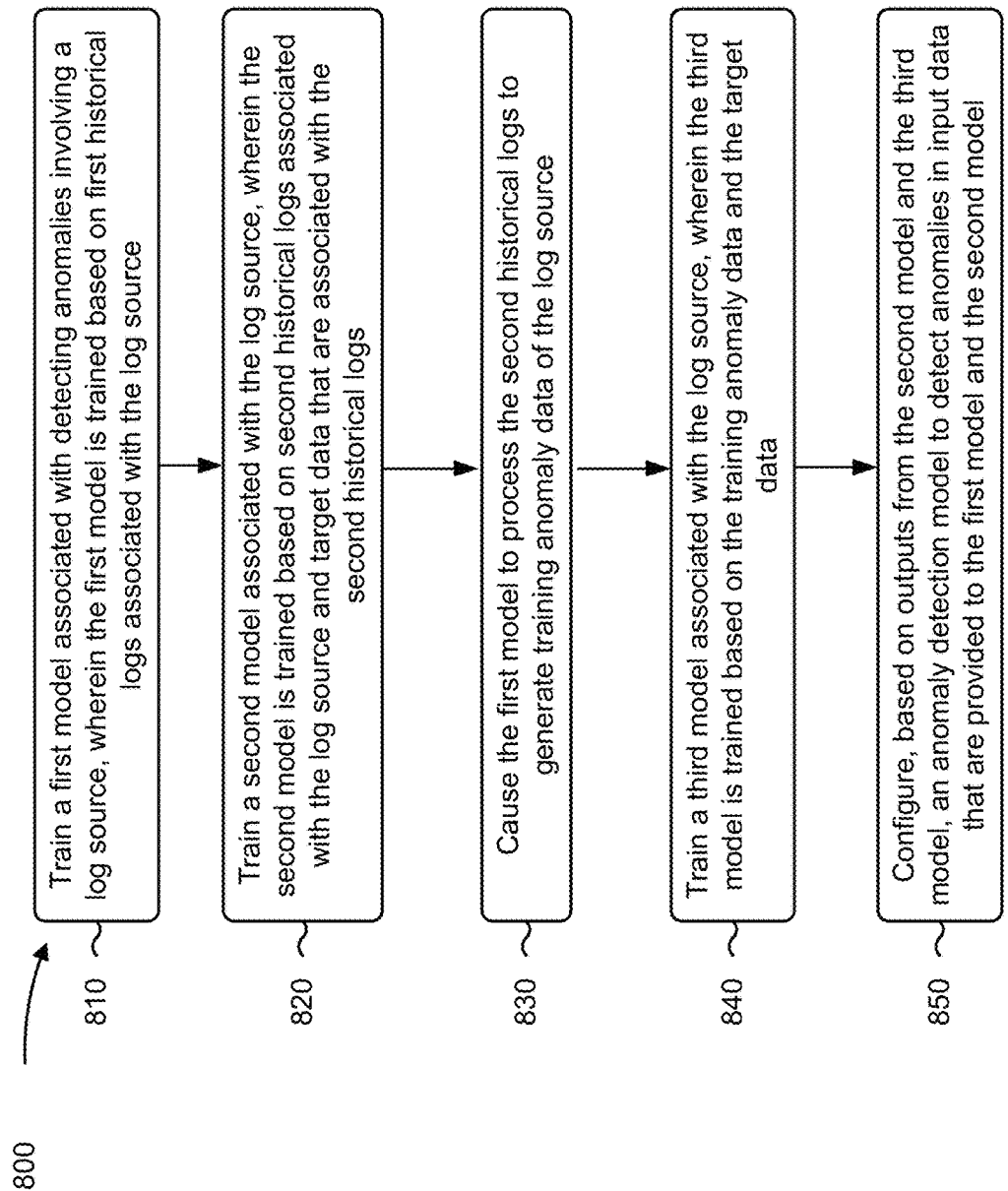
FIGS. 8-10 are flowcharts of example processes relating to anomaly detection according to a multi-model analysis.

FIG. 8 is a flowchart of an example process 800 for anomaly detection according to a multi-model analysis. In some implementations, one or more process blocks of FIG. 8 may be performed by an anomaly detection system (e.g., anomaly detection system 401). In some implementations, one or more process blocks of FIG. 8 may be performed by another device or a group of devices separate from or including the anomaly detection system, such as a log data source (e.g., log data source 430), a target data source (e.g., target data source 440), and/or the like.

As shown in FIG. 8, process 800 may include training a first model associated with detecting anomalies involving a log source, wherein the first model is trained based on first historical logs associated with the log source (block 810). For example, the anomaly detection system (e.g., using processor 320, memory 330, storage component 340, input component 350, output component 360, communication interface 370, and/or the like) may train a first model associated with detecting anomalies involving a log source, as described above. In some implementations, the first model is trained based on first historical logs associated with the log source.

As further shown in FIG. 8, process 800 may include training a second model associated with the log source, wherein the second model is trained based on second historical logs associated with the log source and target data that are associated with the second historical logs (block 820). For example, the anomaly detection system (e.g., using processor 320, memory 330, storage component 340, input component 350, output component 360, communication interface 370, and/or the like) may train a second model associated with the log source, as described above. In some implementations, the second model is trained based on second historical logs associated with the log source and target data that are associated with the second historical logs.

As further shown in FIG. 8, process 800 may include causing the first model to process the second historical logs to generate training anomaly data of the log source (block 830). For example, the anomaly detection system (e.g., using processor 320, memory 330, storage component 340, input component 350, output component 360, communication interface 370, and/or the like) may cause the first model to process the second historical logs to generate training anomaly data of the log source, as described above.

As further shown in FIG. 8, process 800 may include training a third model associated with the log source, wherein the third model is trained based on the training anomaly data and the target data (block 840). For example, the anomaly detection system (e.g., using processor 320, memory 330, storage component 340, input component 350, output component 360, communication interface 370, and/or the like) may train a third model associated with the log source, as described above. In some implementations, the third model is trained based on the training anomaly data and the target data.

As further shown in FIG. 8, process 800 may include configuring, based on outputs from the second model and the third model, an anomaly detection model to detect anomalies in input data that is provided to the first model and the second model (block 850). For example, the anomaly detection system (e.g., using processor 320, memory 330, storage component 340, input component 350, output component 360, communication interface 370, and/or the like) may configure, based on outputs from the second model and the third model, an anomaly detection model to detect anomalies in input data that are provided to the first model and the second model, as described above.

Process 800 may include additional implementations, such as any single implementation or any combination of implementations described below and/or in connection with one or more other processes described elsewhere herein.

In a first implementation, the first historical logs are logs that do not include anomalies and the second historical logs are logs that include anomalies.

In a second implementation, alone or in combination with the first implementation, the target data are associated with one or more previously detected anomalies within the second historical logs.

In a third implementation, alone or in combination with one or more of the first and second implementations, the third model is a different type of model from the first model or the third model is a different type of model from the second model.

In a fourth implementation, alone or in combination with one or more of the first through third implementations, the first model and the second model are neural networks.

In a fifth implementation, alone or in combination with one or more of the first through fourth implementations, the third model is an association matrix and at least one of the first model or the second model is a neural network.

In a sixth implementation, alone or in combination with one or more of the first through fifth implementations, the log source comprises a data structure that is configured to maintain logs associated with events involving at least one of a particular device, a particular application, or a particular network.

Although FIG. 8 shows example blocks of process 800, in some implementations, process 800 may include additional blocks, fewer blocks, different blocks, or differently arranged blocks from those depicted in FIG. 8. Additionally, or alternatively, two or more of the blocks of process 800 may be performed in parallel.

Figure 9:
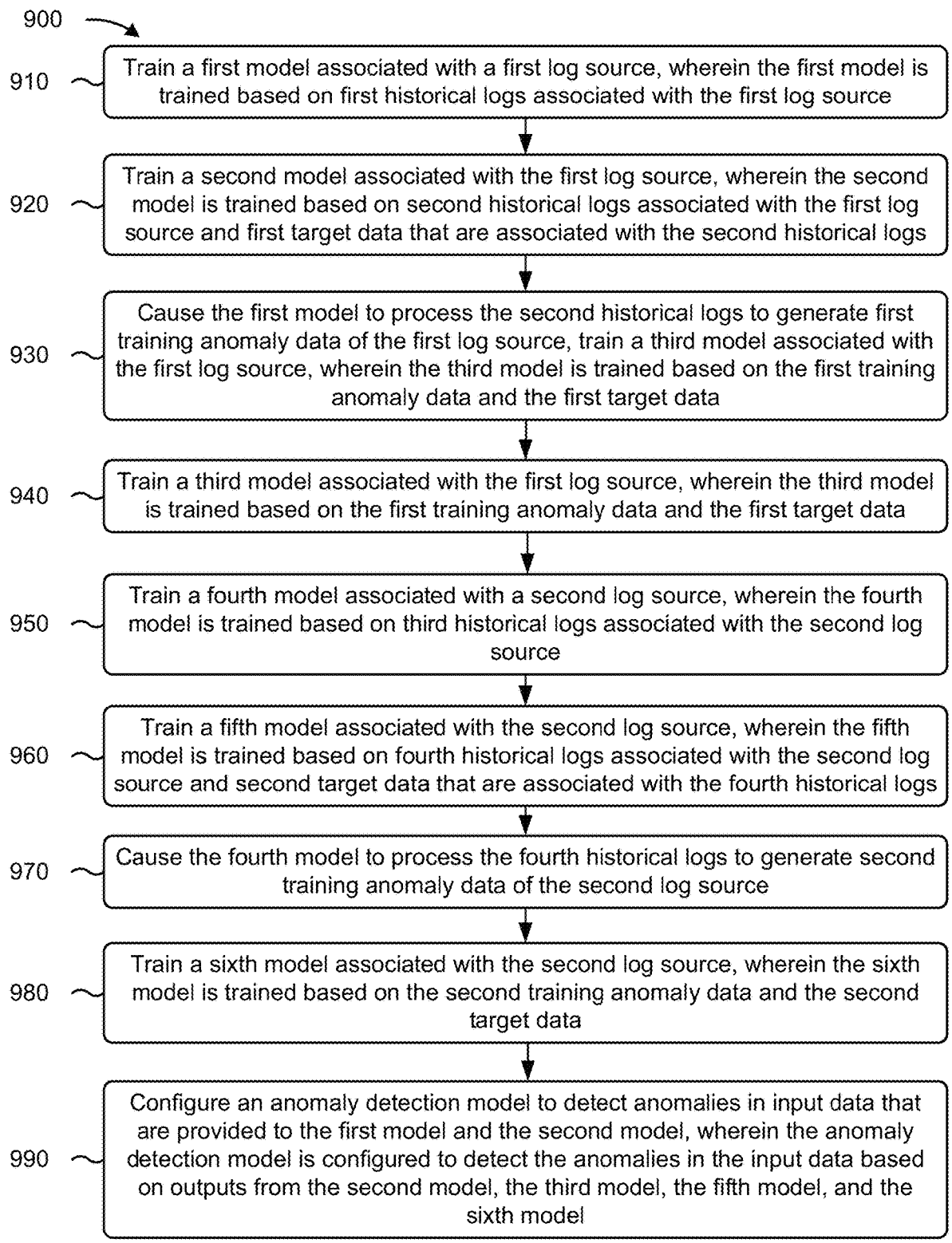

FIG. 9 is a flowchart of an example process 900 for anomaly detection according to a multi-model analysis. In some implementations, one or more process blocks of FIG. 9 may be performed by an anomaly detection system (e.g., anomaly detection system 401). In some implementations, one or more process blocks of FIG. 9 may be performed by another device or a group of devices separate from or including the anomaly detection system, such as a log data source (e.g., log data source 430), a target data source (e.g., target data source 440), and/or the like.

As shown in FIG. 9, process 900 may include training a first model associated with a first log source, wherein the first model is trained based on first historical logs associated with the first log source (block 910). For example, the anomaly detection system (e.g., using processor 320, memory 330, storage component 340, input component 350, output component 360, communication interface 370, and/or the like) may train a first model associated with a first log source, as described above. In some implementations, the first model is trained based on first historical logs associated with the first log source.

As further shown in FIG. 9, process 900 may include training a second model associated with the first log source, wherein the second model is trained based on second historical logs associated with the first log source and first target data that are associated with the second historical logs (block 920). For example, the anomaly detection system (e.g., using processor 320, memory 330, storage component 340, input component 350, output component 360, communication interface 370, and/or the like) may train a second model associated with the first log source, as described above. In some implementations, the second model is trained based on second historical logs associated with the first log source and first target data that are associated with the second historical logs.

As further shown in FIG. 9, process 900 may include causing the first model to process the second historical logs to generate first training anomaly data of the first log source (block 930). For example, the anomaly detection system (e.g., using processor 320, memory 330, storage component 340, input component 350, output component 360, communication interface 370, and/or the like) may cause the first model to process the second historical logs to generate first training anomaly data of the first log source, as described above.

As further shown in FIG. 9, process 900 may include training a third model associated with the first log source, wherein the third model is trained based on the first training anomaly data and the first target data (block 940). For example, the anomaly detection system (e.g., using processor 320, memory 330, storage component 340, input component 350, output component 360, communication interface 370, and/or the like) may train a third model associated with the first log source, as described above. In some implementations, the third model is trained based on the first training anomaly data and the first target data.

As further shown in FIG. 9, process 900 may include training a fourth model associated with a second log source, wherein the fourth model is trained based on third historical logs associated with the second log source (block 950). For example, the anomaly detection system (e.g., using processor 320, memory 330, storage component 340, input component 350, output component 360, communication interface 370, and/or the like) may train a fourth model associated with a second log source, as described above. In some implementations, the fourth model is trained based on third historical logs associated with the second log source.

As further shown in FIG. 9, process 900 may include training a fifth model associated with the second log source, wherein the fifth model is trained based on fourth historical logs associated with the second log source and second target data that are associated with the fourth historical logs (block 960). For example, the anomaly detection system (e.g., using processor 320, memory 330, storage component 340, input component 350, output component 360, communication interface 370, and/or the like) may train a fifth model associated with the second log source, as described above. In some implementations, the fifth model is trained based on fourth historical logs associated with the second log source and second target data that are associated with the fourth historical logs.

As further shown in FIG. 9, process 900 may include causing the fourth model to process the fourth historical logs to generate second training anomaly data of the second log source (block 970). For example, the anomaly detection system (e.g., using processor 320, memory 330, storage component 340, input component 350, output component 360, communication interface 370, and/or the like) may cause the fourth model to process the fourth historical logs to generate second training anomaly data of the second log source, as described above.

As further shown in FIG. 9, process 900 may include training a sixth model associated with the second log source, wherein the sixth model is trained based on the second training anomaly data and the second target data (block 980). For example, the anomaly detection system (e.g., using processor 320, memory 330, storage component 340, input component 350, output component 360, communication interface 370, and/or the like) may train a sixth model associated with the second log source, as described above. In some implementations, the sixth model is trained based on the second training anomaly data and the second target data.

As further shown in FIG. 9, process 900 may include configuring an anomaly detection model to detect anomalies in input data that are provided to the first model and the second model, wherein the anomaly detection model is configured to detect the anomalies in the input data based on outputs from the second model, the third model, the fifth model, and the sixth model (block 990). For example, the anomaly detection system (e.g., using processor 320, memory 330, storage component 340, input component 350, output component 360, communication interface 370, and/or the like) may configure an anomaly detection model to detect anomalies in input data that are provided to the first model and the second model, as described above. In some implementations, the anomaly detection model is configured to detect the anomalies in the input data based on outputs from the second model, the third model, the fifth model, and the sixth model.

Process 900 may include additional implementations, such as any single implementation or any combination of implementations described below and/or in connection with one or more other processes described elsewhere herein.

In a first implementation, the first historical logs and third historical logs are logs that do not include anomalies, and the second historical logs and fourth historical logs are logs that include anomalies.

In a second implementation, alone or in combination with the first implementation, the target data are associated with one or more previously detected anomalies involving at least one of the first log source or the second log source.

In a third implementation, alone or in combination with one or more of the first and second implementations, the first model is a same type of model as the fourth model, the second model is a same type of model as the fifth model, and the third model is a same type of model as the sixth model.

In a fourth implementation, alone or in combination with one or more of the first through third implementations, the first model, the second model, the fourth model, and the fifth model are individual neural networks.

In a fifth implementation, alone or in combination with one or more of the first through fourth implementations, the third model and sixth model are association matrices.

In a sixth implementation, alone or in combination with one or more of the first through fifth implementations, the first log source and the second log source are configured to maintain individual logs associated with an event involving at least one of: a particular device, a particular application, or a particular network.

Although FIG. 9 shows example blocks of process 900, in some implementations, process 900 may include additional blocks, fewer blocks, different blocks, or differently arranged blocks from those depicted in FIG. 9. Additionally, or alternatively, two or more of the blocks of process 900 may be performed in parallel.

Figure 10:
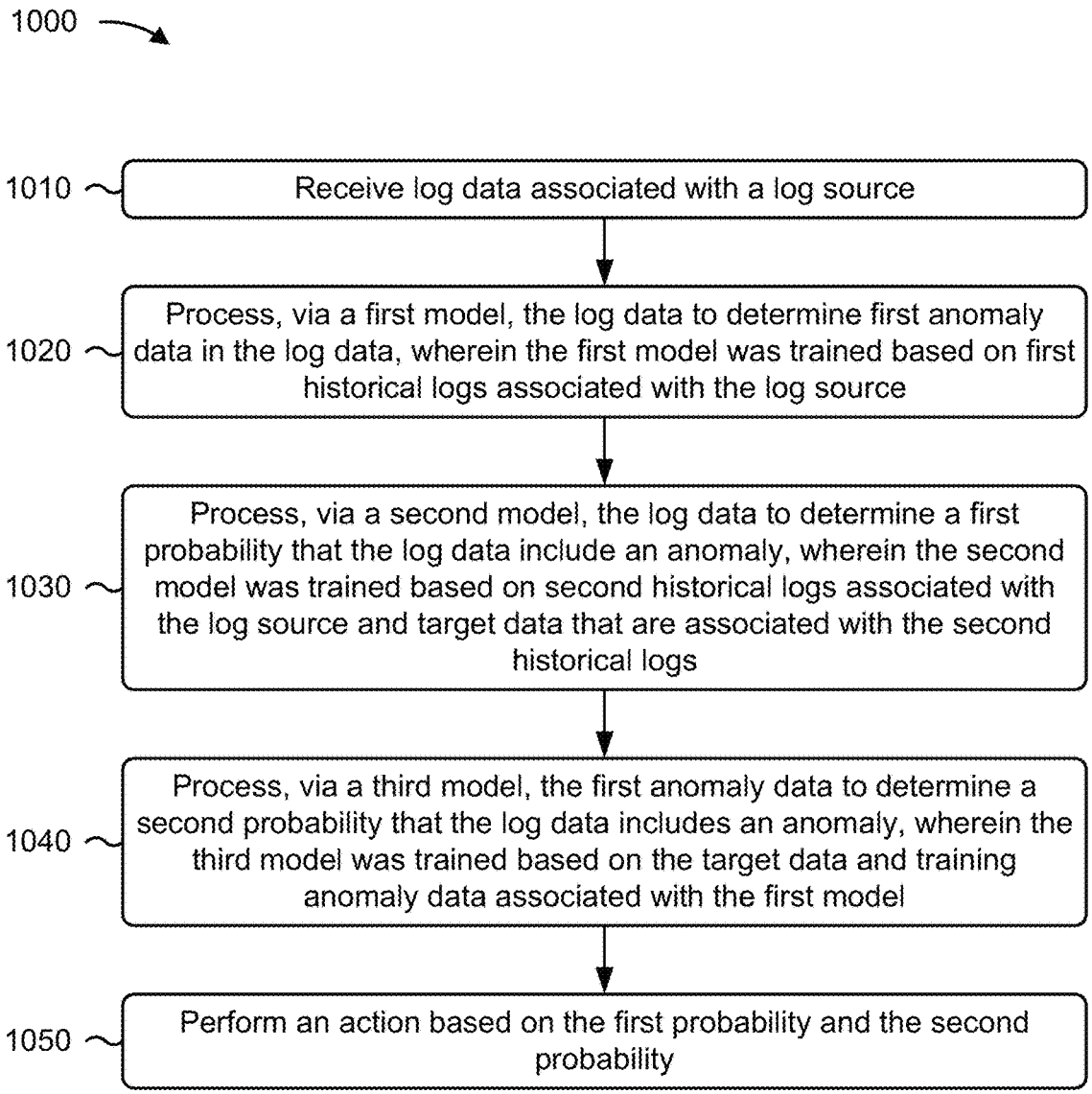

FIG. 10 is a flowchart of an example process 1000 for anomaly detection according to a multi-model analysis. In some implementations, one or more process blocks of FIG. 10 may be performed by an anomaly detection system (e.g., anomaly detection system 401). In some implementations, one or more process blocks of FIG. 10 may be performed by another device or a group of devices separate from or including the anomaly detection system, such as a log data source (e.g., log data source 430), a target data source (e.g., target data source 440), and/or the like.

As shown in FIG. 10, process 1000 may include receiving log data associated with a log source (block 1010). For example, the anomaly detection system (e.g., using processor 320, memory 330, storage component 340, input component 350, output component 360, communication interface 370, and/or the like) may receive log data associated with a log source, as described above.

As further shown in FIG. 10, process 1000 may include processing, via a first model, the log data to determine first anomaly data in the log data, wherein the first model was trained based on first historical logs associated with the log source (block 1020). For example, the anomaly detection system (e.g., using processor 320, memory 330, storage component 340, input component 350, output component 360, communication interface 370, and/or the like) may process, via a first model, the log data to determine first anomaly data in the log data, as described above. In some implementations, the first model was trained based on first historical logs associated with the log source.

As further shown in FIG. 10, process 1000 may include processing, via a second model, the log data to determine a first probability that the log data include an anomaly, wherein the second model was trained based on second historical logs associated with the log source and target data that are associated with the second historical logs (block 1030). For example, the anomaly detection system (e.g., using processor 320, memory 330, storage component 340, input component 350, output component 360, communication interface 370, and/or the like) may process, via a second model, the log data to determine a first probability that the log data include an anomaly, as described above. In some implementations, the second model was trained based on second historical logs associated with the log source and target data that are associated with the second historical logs.

As further shown in FIG. 10, process 1000 may include processing, via a third model, the first anomaly data to determine a second probability that the log data include an anomaly, wherein the third model was trained based on the target data and training anomaly data associated with the first model (block 1040). For example, the anomaly detection system (e.g., using processor 320, memory 330, storage component 340, input component 350, output component 360, communication interface 370, and/or the like) may process, via a third model, the first anomaly data to determine a second probability that the log data include an anomaly, as described above. In some implementations, the third model was trained based on the target data and training anomaly data associated with the first model.

As further shown in FIG. 10, process 1000 may include performing an action based on the first probability and the second probability (block 1050). For example, the anomaly detection system (e.g., using processor 320, memory 330, storage component 340, input component 350, output component 360, communication interface 370, and/or the like) may perform an action based on the first probability and the second probability, as described above.

Process 1000 may include additional implementations, such as any single implementation or any combination of implementations described below and/or in connection with one or more other processes described elsewhere herein.

In a first implementation, the first historical logs are logs that do not include anomalies and the second historical logs are logs that do include anomalies.

In a second implementation, alone or in combination with the first implementation, the target data are associated with one or more previously detected anomalies within the second historical logs.

In a third implementation, alone or in combination with one or more of the first and second implementations, the first model and the second model are individually trained recurrent neural networks.

In a fourth implementation, alone or in combination with one or more of the first through third implementations, performing the action includes identifying a log of the log data; and determining, based on the first probability satisfying a threshold and the second probability satisfying the threshold, that the log is associated with an anomaly.

In a fifth implementation, alone or in combination with one or more of the first through fourth implementations, performing the action includes indicating, via a user interface and based on the first probability satisfying a threshold and the second probability satisfying the threshold, that a log of the log data is likely associated with an anomaly; receiving, from the user interface, a training response associated with the log including an anomaly; and retraining, based on the training response, at least one of the first model, the second model, or the third model.

Although FIG. 10 shows example blocks of process 1000, in some implementations, process 1000 may include additional blocks, fewer blocks, different blocks, or differently arranged blocks from those depicted in FIG. 10. Additionally, or alternatively, two or more of the blocks of process 1000 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    training, by a device, a first model of a plurality of first models of a first layer of a model matrix,
        wherein the first model is associated with detecting anomalies involving a log source,
        wherein the first model is a first neural network,
        wherein the first model is trained using historical true logs, and
        wherein the historical true logs do not include anomalies;
    causing, by the device and after training the first model using the historical true logs, the first model to process historical false logs to generate training anomaly data of the log source,
        wherein the historical false logs include anomalies:
    training, by the device, a second model of a plurality of second models of a second layer of the model matrix,
        wherein the second model is associated with the log source,
        wherein the second model is a second neural network,
        wherein the second model is trained based on the historical false logs and based on target data associated with the historical false logs, and
        wherein the target data identifies one or more detected anomalies within the historical false logs;

training, by the device, a third model of a plurality of third models of the model matrix,
  wherein the third model is associated with the log source, and
  wherein the third model is trained based on the training anomaly data and based on the target data;
configuring, by the device and based on outputs from the second model and the third model, an anomaly detection model, of the model matrix, to detect anomalies in input data provided to the first model and the second model; and
retraining, by the device and based on feedback regarding accuracy, the anomaly detection model and one or more of the plurality of first models, the plurality of second models, or the plurality of third models.

2. The method of claim 1, wherein, at least one of:
the third model is a different type of model from the first model, or
the third model is a different type of model from the second model.

3. The method of claim 1, wherein the third model is an association matrix.

4. The method of claim 1, wherein the log source comprises a data structure configured to maintain logs associated with events involving at least one of:
  a particular device,
  a particular application, or
  a particular network.

5. The method of claim 1, further comprising:
expanding the model matrix to include one or more additional layers.

6. The method of claim 1, wherein the model matrix is scalable horizontally or vertically.

7. The method of claim 1, wherein retraining the anomaly detection model and one or more of the plurality of first models, the plurality of second models, or the plurality of third models comprises:
  retraining, based on the feedback regarding accuracy, the plurality of first models, the plurality of second models, the plurality of third models, and the anomaly detection model.

8. The method of claim 1, further comprising:
tuning, using one or more hyperparameters, one or more of the first model, the second model, or the third model.

9. A device, comprising:
one or more memories; and
one or more processors, communicatively coupled to the one or more memories, configured to:
  train, using historical true logs that do not include anomalies, a first model of a plurality of first models,
    wherein the first model is associated with a first log source, and
    wherein the first model is a first neural network;
  cause, after the first model is trained using the historical true logs, the first model to process historical false logs to generate first training anomaly data of the first log source,
    wherein the historical false logs include anomalies:
  train, based on the historical false logs, a second model of a plurality of second models,
    wherein the second model is associated with the first log source or a second log source, and
    wherein the second model is a second neural network;
  train, based on the first training anomaly data, a third model of a plurality of third models;
  configure, based on outputs from the second model and the third model, an anomaly detection model to detect anomalies in input data provided to the first model and the second model; and
  retrain, based on feedback regarding accuracy, the anomaly detection model and one or more of the plurality of first models, the plurality of second models, or the plurality of third models.

10. The device of claim 9, wherein the second model is associated with the first log source,
  wherein the one or more processors are further configured to:
    train, based on first historical logs associated with the second log source, a fourth model associated with the second log source; and
    train, based on second historical logs associated with the second log source, a fifth model associated with the second log source,
      wherein the first historical logs do not include anomalies, and
      wherein the second historical logs include anomalies.

11. The device of claim 9, wherein, to train the second model, the one or more processors are configured to train the second model based on the historical false logs and based on target data, and
  wherein the target data identifies one or more previously detected anomalies within the historical false logs.

12. The device of claim 9, wherein the second model is associated with the first log source,
  wherein the one or more processors are further configured to:
    train, based on first historical logs associated with the second log source, a fourth model;
    train, based on second historical logs associated with the second log source, a fifth model;
    cause the fourth model to process the second historical logs to generate second training anomaly data of the second log source; and
    train, based on the second training anomaly data, a sixth model associated with the second log source,
  wherein the anomaly detection model is configured to detect the anomalies in the input data based on outputs from the second model, the third model, the fifth model, and the sixth model, and
  wherein the first model is a same type of model as the fourth model, the second model is a same type of model as the fifth model, and the third model is a same type of model as the sixth model.

13. The device of claim 9, wherein the second model is associated with the first log source,
  wherein the one or more processors are further configured to:
    train, based on first historical logs associated with the second log source, a fourth model;
    train, based on second historical logs associated with the second log source, a fifth model;
    cause the fourth model to process the second historical logs to generate second training anomaly data of the second log source; and
    train, based on the second training anomaly data, a sixth model associated with the second log source,
  wherein the anomaly detection model is configured to detect the anomalies in the input data based on outputs from the second model, the third model, the fifth model, and the sixth model, and wherein the fourth model and the fifth model are individual neural networks.

14. The device of claim 9, wherein the second model is associated with the first log source,
wherein the one or more processors are further configured to:
train, based on first historical logs associated with the second log source, a fourth model;
train, based on second historical logs associated with the second log source, a fifth model;
cause the fourth model to process the second historical logs to generate second training anomaly data of the second log source; and
train, based on the second training anomaly data, a sixth model associated with the second log source,
wherein the anomaly detection model is configured to detect the anomalies in the input data based on outputs from the second model, the third model, the fifth model, and the sixth model, and
wherein the third model and sixth model are association matrices.

15. The device of claim 9, wherein the first log source and the second log source are configured to maintain individual logs associated with an event involving at least one of:
a particular device,
a particular application, or
a particular network.

16. A non-transitory computer-readable medium storing instructions, the instructions comprising:
one or more instructions that, when executed by one or more processors, cause the one or more processors to:
train, using historical true logs that do not include anomalies, a first model of a plurality of first models,
wherein the first model is a first neural network;
cause, after the first model is trained using the historical true logs, the first model to process historical false logs to generate training anomaly data,
wherein the historical false logs include anomalies:
train, based on the historical false logs, a second model of a plurality of second models,
wherein the second model is a second neural network;
train, based on the training anomaly data, a third model of a plurality of third models;
configure an anomaly detection model based on one or more of the first model, the second model, or the third model; and
retrain, based on feedback regarding accuracy, the anomaly detection model and one or more of the plurality of first models, the plurality of second models, or the plurality of third models.

17. The non-transitory computer-readable medium of claim 16, wherein the one or more instructions, that cause the one or more processors to train the second model, cause the one or more processors to:
train the second model based on the historical false logs and based on target data that identifies one or more previously detected anomalies within the historical false logs.

18. The non-transitory computer-readable medium of claim 16, wherein the first neural network and the second neural network are individually trained recurrent neural networks.

19. The non-transitory computer-readable medium of claim 16, wherein the one or more instructions further cause the one or more processors to:
receive log data associated with a log source;
identify a log of the log data;
process, via the first model, the log data to determine first anomaly data in the log data;
process, via the second model, the log data to determine a first probability that the log data include an anomaly;
process, via the third model, the first anomaly data to determine a second probability that the log data include an anomaly; and
determine, based on the first probability satisfying a threshold and the second probability satisfying the threshold, that the log is associated with an anomaly.

20. The non-transitory computer-readable medium of claim 16, wherein the one or more instructions further cause the one or more processors to:
process, via the first model, log data to determine first anomaly data in the log data;
process, via the second model, the log data to determine a first probability that the log data include an anomaly;
process, via the third model, the first anomaly data to determine a second probability that the log data include an anomaly;
indicate, via a user interface and based on the first probability satisfying a threshold and the second probability satisfying the threshold, that a log of the log data is likely associated with an anomaly;
receive, from the user interface, a training response associated with the log including an anomaly; and
retrain, based on the training response, at least one of the first model, the second model, or the third model.

* * * * *